US010119610B2

(12) United States Patent
Lee et al.

(10) Patent No.: US 10,119,610 B2
(45) Date of Patent: Nov. 6, 2018

(54) METHOD FOR CONTROLLING LINE PRESSURE OF AUTOMATIC TRANSMISSION

(71) Applicants: HYUNDAI MOTOR COMPANY, Seoul (KR); KIA MOTORS CORPORATION, Seoul (KR)

(72) Inventors: Hyun Ku Lee, Seoul (KR); Sa Man Hong, Seoul (KR); Moo Suk Kim, Hwaseong-si (KR); Jin Seung Lim, Seoul (KR); Seung Jin Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 117 days.

(21) Appl. No.: 15/187,282

(22) Filed: Jun. 20, 2016

(65) Prior Publication Data

US 2017/0130824 A1   May 11, 2017

(30) Foreign Application Priority Data

Nov. 5, 2015   (KR) .......................... 10-2015-0155362

(51) Int. Cl.
*F16H 61/00* (2006.01)
*F16H 57/04* (2010.01)
*F16H 57/00* (2012.01)

(52) U.S. Cl.
CPC ..... *F16H 61/0021* (2013.01); *F16H 57/0006* (2013.01); *F16H 57/0435* (2013.01); *F16H 57/0446* (2013.01); *F16H 2061/0037* (2013.01)

(58) Field of Classification Search
CPC ............. F16H 61/0021; F16H 57/0446; F16H 2312/02; F16H 2312/022
See application file for complete search history.

(56) References Cited

U.S. PATENT DOCUMENTS 5,967,941 A * 10/1999 Nishina ............... F16H 61/0021
477/115
2006/0070475 A1* 4/2006 Kodama ............. F16H 61/0021
74/473.11

(Continued)

FOREIGN PATENT DOCUMENTS

JP   2004124959 A *  4/2004  ....... F16H 61/66272
JP   2008-223826 A   9/2008

(Continued)

OTHER PUBLICATIONS

Machine translation of JP 2004124959, retrieved from espacenet.com on Dec. 11, 2017.*

*Primary Examiner* — Stacey A Fluhart
(74) *Attorney, Agent, or Firm* — McDermott Will & Emery LLP

(57) ABSTRACT

A method for controlling a line pressure of an automatic transmission, and controlling the line pressure when oil is supplied to elements of the automatic transmission through hydraulic passages and valves of a valve body at the time of initially starting a vehicle includes a line pressure setting operation of setting the line pressure of the automatic transmission to be equal to or lower than a set pressure when a vehicle is initially started, and a line pressure converting operation of converting the line pressure into a pressure equal to or higher than the set pressure when the automatic transmission is operated for shifting or when a set time has lapsed since initial vehicle starting.

4 Claims, 2 Drawing Sheets

(56) References Cited

U.S. PATENT DOCUMENTS

2009/0131218 A1\* 5/2009 Nedachi .................. F16D 48/08
477/97
2009/0152077 A1\* 6/2009 Lee ..................... F16H 61/0251
200/43.03

FOREIGN PATENT DOCUMENTS

| KR | 10-0387807 B1 | 6/2003 |
| KR | 10-2010-0033760 A | 3/2010 |
| KR | 10-1055823 B1 | 8/2011 |

\* cited by examiner

METHOD FOR CONTROLLING LINE PRESSURE OF AUTOMATIC TRANSMISSION

CROSS-REFERENCE TO RELATED APPLICATION

This application claims the benefit of priority to Korean Patent Application No. 10-2015-0155362, filed on Nov. 5, 2015 with the Korean Intellectual Property Office, the disclosure of which is incorporated herein in its entirety by reference.

TECHNICAL FIELD

The present disclosure relates to a method for controlling line pressure of an automatic transmission and, more particularly, to a method for controlling a line pressure of an automatic transmission to reliably prevent noise from being created by a valve body of an automatic transmission when a vehicle that has been left parked for a long period of time is initially started.

BACKGROUND

An automatic transmission may include a torque converter for transmitting power of an engine, a planetary gear set for receiving power from the torque converter, shifting power according to a vehicle speed and transferring the shifted power to an output shaft, and a plurality of clutches and a brake installed to change a speed by controlling the planetary gear set.

The automatic transmission may have a hydraulic system supplying oil to lubricate a lubrication element (a bearing, a bush, or a gear), cool a cooling element (an electric motor, etc.), and form a control pressure of a control element (a clutch, a brake, or a torque converter).

The hydraulic system of the automatic transmission may have a valve body in which a plurality of hydraulic passages and a plurality of valves are prepared and an oil pump for supplying oil to the hydraulic passages of the valve body.

FIG. 1 is a view illustrating a partial structure of a valve body 10.

Referring to FIG. 1, an oil pan 21 for storing oil may be disposed below the valve body 10, and an oil pump 22 may be connected to the oil pan 21. A plurality of hydraulic passages such as a first hydraulic passage 11 and a second hydraulic passage 12 may be formed in the valve body 10. A regulator valve 13 may be disposed between the first hydraulic passage 11 and the second hydraulic passage 12, and a torque converter control valve 14 controlling a torque converter 15 may be installed in the middle of the second hydraulic passage 12. A first re-circulation passage 31 may extend from the regulator valve 13 to the oil pan 21, and a second re-circulation passage 32 may extend from the torque converter control valve 14 to the oil pan 21. The first re-circulation passage 31 and the second re-circulation passage 32 may join at one point and connect to the oil pan 21.

As oil is pumped by the oil pump 22 from the oil pan 21 and supplied to the regulator valve 13 through the first hydraulic passage 11, line pressure may be formed in the first hydraulic passage 11.

The regulator valve 13 may convert the line pressure supplied through the first hydraulic passage 11 into control pressure and output the control pressure, and the control pressure may be supplied to the torque converter control valve 14, appropriately converted by the torque converter control valve 14, and may be supplied to a control element such as the torque converter 15.

The valve body 10 may be installed on one side of a housing of the automatic transmission, and thus, when the vehicle is parked for a long period of time, oil within the valve body 10 may move downwardly due to gravitation to cause an empty space without oil to be formed in the hydraulic passages. Accordingly, the first re-circulation passage 31 and the second re-circulation passage 32 of the valve body 10 may become filled with air. In this state, when the vehicle, which has been parked for a long period of time, is initially started, air of the re-circulation passages 31 and 32 may be drawn into to the oil pump 22 to cause noise (which may be an abnormal noise).

In detail, in a case in which when pressure in the first hydraulic passage 11 is high, high pressure may instantly pushes air to the re-circulation passages 31 and 32, and thus, air within the re-circulation passages 31 and 32 is rapidly reduced in volume at a discharge port of the oil pump 22, generating noise (which may be an abnormal noise).

Also, after the initial starting, the re-circulation passages 31 and 32 may be filled with oil, and thus, a noise may not be not generated when the vehicle is started for the second time and thereafter.

In this manner, in past procedures of the related art, when the vehicle is initially started after having been left parked for a long period of time, noise may be made due to high line pressure within the valve body of the automatic transmission and such noise may cause an adverse reaction and make a driver feel uneasy.

SUMMARY

The present disclosure has been made to solve the above-mentioned problems occurring in the prior art while advantages achieved by the prior art are maintained intact.

An aspect of the present disclosure provides a method for controlling a line pressure of an automatic transmission to reliably prevent noise from being created by a valve body of an automatic transmission when a vehicle that has been left parked for a long period of time is initially started, by maintaining line pressure at a level equal to or lower than a preset value at the time of initial starting of the vehicle that has been left parked for a long period of time, to thereby fill a hydraulic passage, which has not been filled with oil at the initial time of starting, with oil.

According to an exemplary embodiment of the present disclosure, a method for controlling a line pressure of an automatic transmission may includes when a vehicle is initially started, setting the line pressure of the automatic transmission to be equal to or lower than a set pressure; and when the automatic transmission is operated for shifting or when a set time has lapsed since initial vehicle starting, converting the line pressure into a pressure equal to or higher than the set pressure.

The set pressure may be a pressure at which oil is introduced to a passage not filled with oil in the initial starting state.

The line pressure may be converted into a pressure equal to or higher than the set pressure within a range in which the line pressure does not exceed a maximum allowable pressure.

According to another exemplary embodiment of the present disclosure, a method for controlling a line pressure of an automatic transmission, by controlling the line pressure when oil is supplied to elements of the automatic transmission through hydraulic passages and valves of a valve body when a vehicle is initially started, may include: a line pressure setting operation of setting a line pressure of the automatic transmission to be equal to or lower than a set pressure when the vehicle is initially started in a state in which a change lever thereof is positioned in a neutral mode or a parking mode; and a line pressure converting operation of converting a line pressure into a pressure required for each of the elements when the change lever changes a mode or when a predetermined time has lapsed after starting.

In the line pressure setting operation, the set pressure may be a maximum line pressure at which oil is provided to fill a re-circulation passage in which oil re-circulates.

In the line pressure converting operation, the line pressure may be converted into a pressure required for each of the elements of the automatic transmission between a maximum allowable line pressure allowed for a hydraulic passage of the valve body and the set pressure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
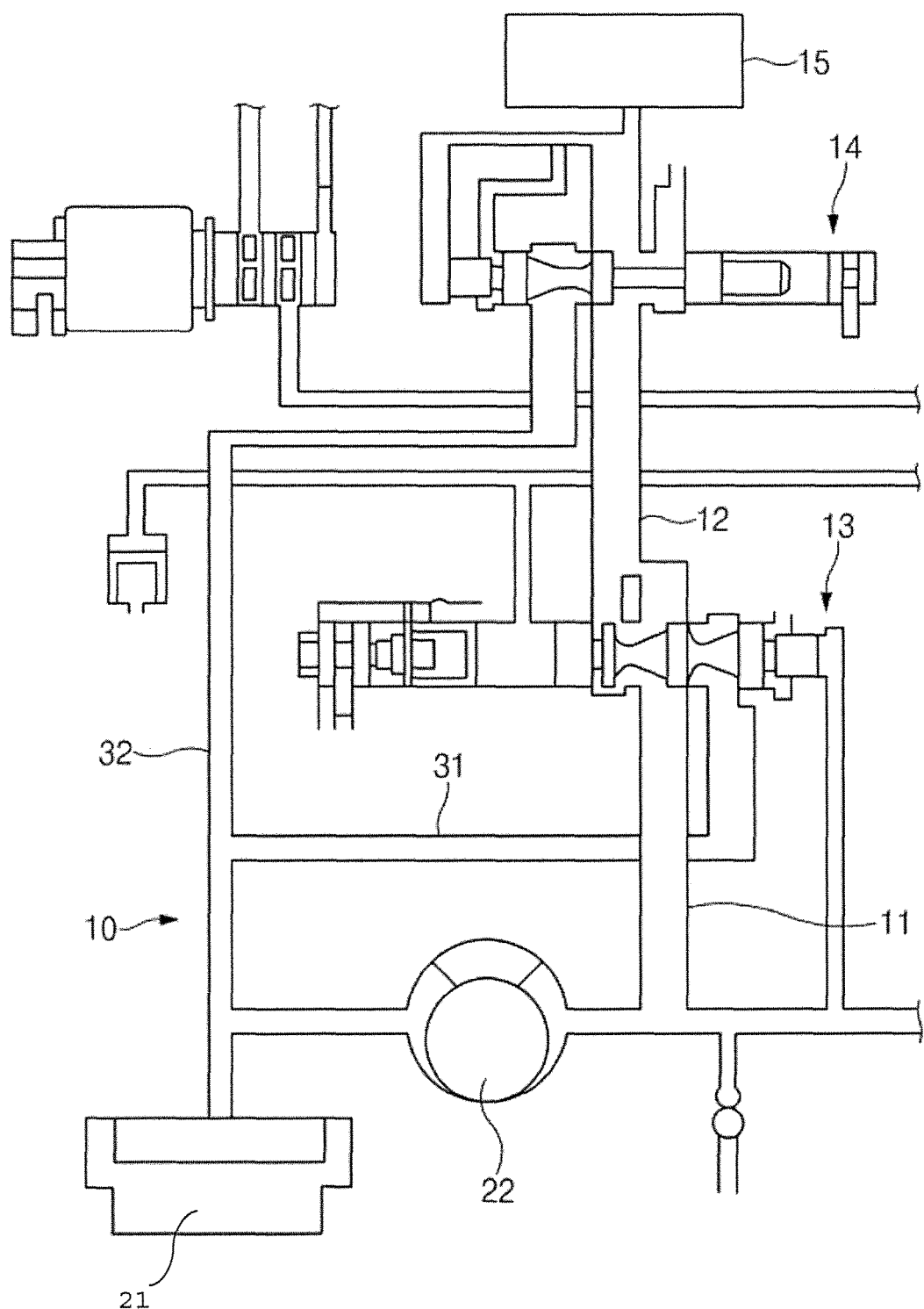
FIG. 1 is a view illustrating a configuration of a hydraulic passage, a regulator valve and an oil pump in a valve body of an automatic transmission.

Hereinafter, exemplary embodiments of the present disclosure will be described in detail with reference to the accompanying drawings. For reference, dimensions of elements or thicknesses of lines illustrated in the drawings referred to describe the present disclosure may be exaggerated for aiding convenience of understanding. Also, the terms used henceforth have been defined in consideration of the functions of the present disclosure, and may be altered according to the intent of a user or operator, or conventional practice. Therefore, the terms should be defined on the basis of the entire content of this specification.

Referring to FIG. 1, in order to supply oil to a control element, a lubrication element and a cooling element in the valve body 10 of the automatic transmission, oil is pumped by the oil pump 22 from the oil pan 21 and supplied to the regulator valve 13 through the first hydraulic passage 11. Here, predetermined line pressure is formed in the first hydraulic passage 11.

As mentioned above regarding the related art, when relatively high line pressure is formed so line pressure in the first hydraulic passage 11 is high, instantaneously high pressure may push air to the re-circulation passage 31 and 32, and accordingly, air within the re-circulation passages 31 and 32 may be rapidly reduced in volume at the discharge port of the oil pump 22, creating a noise.

Thus, in the present disclosure, when a vehicle that has been left parked for a long period of time is initially started, line pressure may be set to be equal to or lower than a set pressure (about 5 bar), oil may be introduced to the interior of the re-circulation passages 31 and 32, may be introduced at an early stage, or may be introduced at an earlier stage than past procedures discussed above, and thus, air within the re-circulation passages 31 and 32 may be gradually reduced in volume at the discharge port of the oil pump, thus preventing creation of a noise.

Here, the set pressure may be a pressure at which oil may be introduced, may be introduced early, or at an earlier time than past procedures discussed above, to the passage (for example, the re-circulation passages 31 and 32 in which oil re-circulates) not filled with oil in the initial starting state, and may be a pressure of about 5 bar, although the pressure may be varied according to vehicle types.

Thereafter, after the initial starting, the line pressure may be converted into the set pressure or higher so that the vehicle may stably perform a normal operation.

Figure 2:
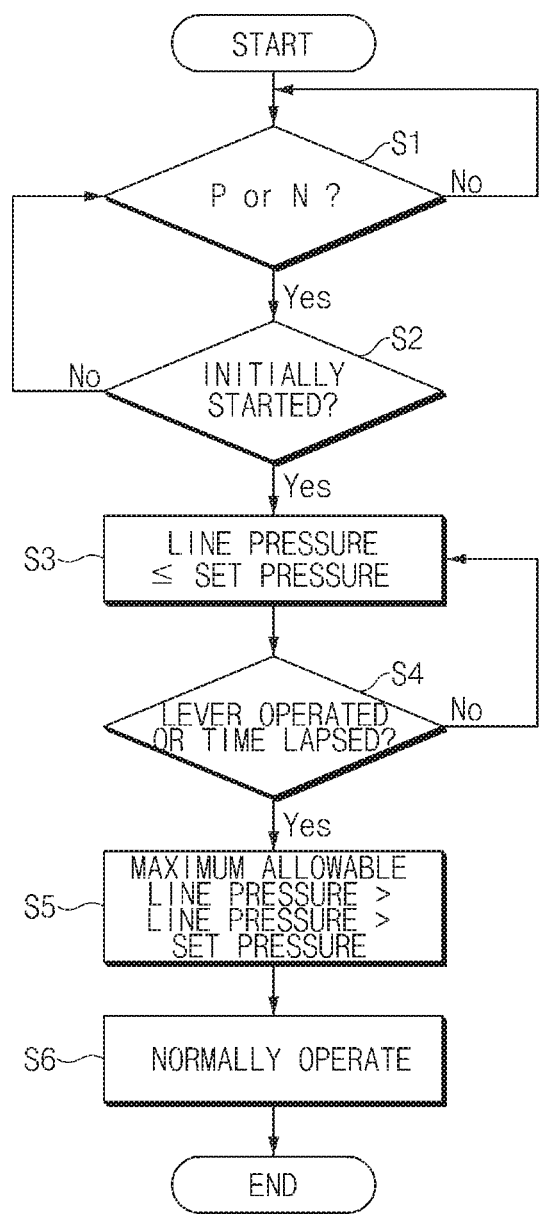
FIG. 2 is a flow chart illustrating a method of controlling line pressure of an automatic transmission according to an exemplary embodiment of the present disclosure.

FIG. 2 is a flow chart illustrating a method of controlling line pressure of an automatic transmission according to an exemplary embodiment of the present disclosure.

Referring to FIG. 2, it may be determined whether a change lever of a vehicle is positioned in a parking mode P or a neutral mode N in operation S1, and when the change lever of the vehicle is positioned in the parking mode P or the neutral mode N, the vehicle may be initially started in operation S2.

When the vehicle is initially started after having been left parked for a long period of time, line pressure may be set to be lower than set pressure in operation S3.

When the line pressure is set to be equal to or lower than the set pressure, oil may be introduced early, or at an earlier time than past procedures discussed above, to a passage not filled with oil such as the re-circulation passages 31 and 32, and thus, air within the re-circulation passages 31 and 32 may be gradually reduced in volume at the discharge port of the oil pump 22, preventing creation of a noise.

Thereafter, when the change lever is operated (for example, shifted from a parking mode P to a reverse mode R or shifted from a neutral mode N to the reverse mode or an N/drive mode D), and when a predetermined time has lapsed since the initial starting in operation S4, the line pressure may be converted to be equal to or higher than the a set pressure in operation S5. In particular, the line pressure may be converted into a pressure required for a control element, a lubrication element, and/or a cooling element.

Regarding conversion of line pressure, in detail, line pressure may be converted into pressure required for each of the elements within a range between the set pressure and maximum allowable line pressure allowed in the hydraulic passages 11 and 12 of the valve body 10 (that is, maximum allowable pressure>line pressure>set pressure).

After the line pressure is converted into pressure required for each of the elements (control element, lubrication element, and/or cooling element) to which oil is to be supplied, the vehicle may be normally operated in operation S6.

According to an exemplary embodiment of the present disclosure, since line pressure may be maintained to be lower than a preset value when a vehicle that has been left parked for a long period of time is initially started, oil may be provided to the hydraulic passage not filled with oil in the initial starting state, and thus, a noise created by the valve body of the automatic transmission at the initial starting may be reliably prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a line pressure of an automatic transmission, which has a regulator valve, a torque converter control valve, an oil pan, and an oil pump, for a vehicle, the method comprising:
- a line pressure setting operation of setting the line pressure of the automatic transmission to be equal to or lower than a set pressure when the vehicle starts; and
- a line pressure converting operation of converting the line pressure into a pressure higher than the set pressure when the automatic transmission is operated for shifting or when a set time has lapsed since the vehicle starting, wherein, in the line pressure setting operation, the set pressure is a pressure at which oil is introduced to re-circulation passages that have not been filled with oil before the vehicle starting, wherein the re-circulation passages comprise:
- a first re-circulation passage extending from the regulator valve to the oil pan; and
- a second re-circulation passage extending from the torque converter control valve to the oil pan, and wherein the first re-circulation passage and the second re-circulation passage adjoin at one point and then extend to the oil pan.

2. The method according to claim 1, wherein, in the line pressure converting operation, the line pressure is converted into a pressure higher than the set pressure within a range in which the line pressure does not exceed a maximum allowable line pressure.

3. The method according to claim 2, wherein the line pressure is converted into a predetermined line pressure in accordance with an operation of elements of the automatic transmission.

4. The method according to claim 1, wherein, in the line pressure setting operation, when the vehicle starts in a state in which a change lever thereof is positioned in a neutral mode or in a parking mode, the line pressure of the automatic transmission is set to be equal to or lower than the set pressure.

* * * * *